Patented Aug. 25, 1936

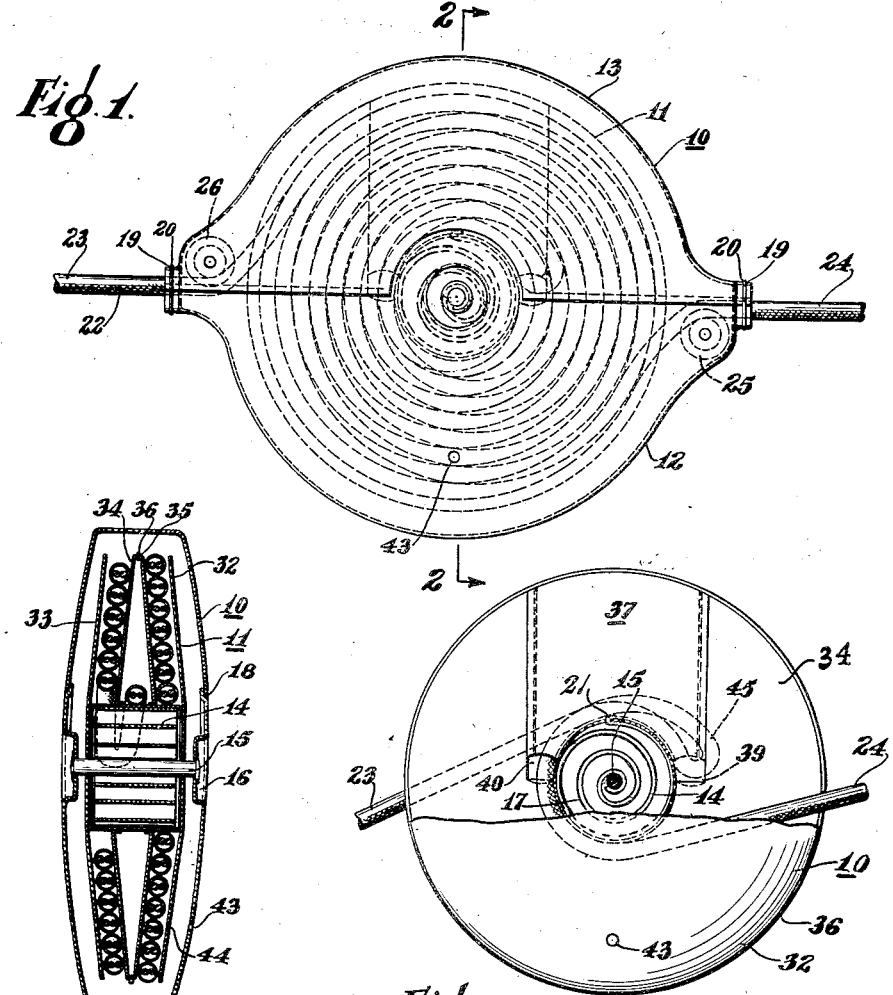

2,052,341

UNITED STATES PATENT OFFICE 2,052,341

REEL

Charles F. Douglass, Cleveland, Ohio

Application April 1, 1935, Serial No. 14,010

2 Claims. (Cl. 242—107)

My invention relates, in general, to winding reels and more particularly to winding reels adapted to wind cords or the like.

While I have illustrated my invention in connection with the cord of an electrical appliance to take up the slack, it is to be understood that my invention may be employed to wind cords of all kinds, wherein it is necessary to take up the slack.

An object of my invention is the provision of a winding reel adapted to be positioned substantially intermediate the ends of the cord that is to be wound, wherein each end of the cord on opposite sides of the intermediate position is wound in reverse direction upon the reel, so that as the ends of the cord are pulled, the said reel unwinds.

Another object of my invention is the provision of a winding reel which is constructed of very light material, so that it offers substantially no interference with the operation of the electrical appliance to which the cord is attached.

Another object of my invention is the provision of a winding reel having a housing which has a smooth outer surface, so that the reel may be moved along the floor or carpet without catching on the floor or carpet.

Another object of my invention is the provision of a duplex reel having two channels upon which the cord is wound and having a partition dividing the two channels of the reel, wherein the partition has a removable sector to facilitate the positioning of the cord as it crosses over from one channel to the other through the partition.

Other objects and a fuller understanding of my invention may be had by referring to the following description and claims, taken in conjunction with the accompanying drawing, in which:

Figure 1 represents a side elevational view of a winding reel embodying the features of my invention;

Figure 2 is a cross-sectional view of the winding reel shown in Figure 1, taken along the line 2—2 thereof;

Figure 3 is a side elevational view of the duplex reel, parts being cut away to illustrate more clearly the construction of the duplex reel;

Figure 4 represents a view showing one-half of my winding reel with the cover portion removed to illustrate the arrangement of the cord upon the duplex reel, the cords being cut in sections to illustrate more fully the manner in which each wrap is wound upon the reel; and, Figure 5 shows the manner in which my invention may be used with an electrical cord attached to a vacuum sweeper.

With reference to the drawing my invention comprises, in general, a housing 10, a duplex reel 11 mounted within the housing 10, a bearing pin 15 for supporting the duplex reel 11, and a spiral spring 14 adapted to rotate the duplex reel for winding the cord.

As illustrated, the housing 10 is constructed of two halves, the lower half being designated by reference character 12, and the upper half being designated by the reference character 13. The upper edge of the lower half 12 of the housing is provided with a shoulder 18 adapted to receive the lower corresponding edge of the upper half 13 of the housing. In other words, the upper half 13 may be assembled upon the lower half 12 in the nature of a lid. As shown best in Figures 1 and 4, the opposite sides of the housing 10, are provided with an extended portion having an opening through which the cord 23 passes. Around this extended portion is a circumferential groove 19 in which is snapped a resilient spring wire 20 for holding the two halves of the housing together. In order to facilitate the movement of the cord 23, as it moves into and out of the housing 10, there is provided in the lower half 12 of the housing, a roller 25 and in the upper half 13 of the housing a roller 26.

The lower half 12 of the housing is provided with centrally disposed depressions 16 into which the bearing pin 15 is non-rotatably mounted. The purpose of the depression 16 is to make the construction such that the outer, exposed ends of the bearing pin 15 do not extend beyond the outer surface of the housing. This means that the housing may be pulled along the floor or carpet without having any portion of the housing catch upon the floor or carpet.

The duplex reel 11 comprises, in general, two outer disks 32 and 33 and a middle partition 34. This construction provides two channels upon which the cord 22 may be wound. The central portion of the reel contains a spiral spring 14 for constraining the reel to rotate for winding up the cord 22. As shown best in Figure 3, the inner end of the spiral spring 14 may be connected to the non-rotatable pin 15 by means of the screws 17, and the free end of the spiral spring 14 may be provided with a hooked end 21 for engaging an opening in the reel 11.

As shown best in Figures 2, 3, and 4, the middle partition 34 is provided with a removable sector 37. This removable sector 37 is held in position by means of a snap spring wire 36 which fits into a circumferential groove 35 provided around the middle partition 34. As illustrated in Figure 4, the substantially vertical sides of the removable sector 37 are V-shape, such as that indicated by the reference character 38. Therefore, when the sector is once mounted within the middle partition 34, it is firmly held in position, and its outer sides lie substantially in the same plane as the outer sides of the middle partition 34. As shown in Figure 3, the lower opposite sides of the sector 37 are foreshortened which provide openings 39 and 40 through which the cord 22 passes as it crosses over from one channel of the duplex reel to the other.

When mounting my winding reel upon a cord, the upper half 13 of the housing is first removed by unfastening the spring wire clips 20 which fit into the circumferential grooves 19. After the upper half 13 of the cover is removed, the operator then takes off the spring wire clip 36 which is snapped in the circumferential groove 35 in the middle partition 34. After the spring wire 36 is removed the operator slides out the sector 37, whereupon the operator places the intermediate portion of the cord through the opening provided by the removal of the sector 37. When the cord is properly positioned, the operator replaces the sector 37, and at the same time snaps in the spring wire 36 for holding the sector 37 in position. At this point, it is noted that the intermediate portion of the cord 22 crosses from one channel of the duplex reel to the other channel passing through the openings 39 and 40, and between the two spaced side walls of the partition 34. This means that the right hand end 24 of the cord 22 on one side of the intermediate portion may be wound from the outside toward the center in a clock-wise direction upon the right hand channel as shown in Figure 2, and such that the left hand end 23 of the cord 22, after it is looped backwards, such as indicated by the reference character 45, may be wound from the center toward the outside in a counterclock-wise direction within the left-hand channel as shown in Figure 2. With this arrangement, the reel is disposed to rotate and unwind as the two ends 23 and 24 of the cord are pulled or released.

Before mounting the intermediate portion of the cord within the cross over opening provided by the removal of the sector 37, the duplex reel is wound under tension, and may be held under such tension by passing a suitable nail or other piece of material through the opening 43 in the housing and through the registered opening 44 which extends through the two outer disks 32 and 33 and the middle partition 34 of the duplex reel. Therefore, after the intermediate portion of the cord is properly placed and after the removable sector 37 is properly replaced, it is only necessary to remove the nail and the spiral spring 14 will wind each end of the cord within the two channels of the reel. Before placing the intermediate portion of the cord within the reel, the reel is wound to such tension as to be sufficient to accommodate the lengths of the ends of the cords on opposite sides of the winding reel. Thus, for example, if the cord is relatively long, as it normally is for a vacuum sweeper, such as that shown by the reference character 42, the spring 14 is wound quite tightly before the intermediate portion of the cord is placed therein. On the other hand, if the cord is relatively short, as it is with the cord of a house-hold iron, the spiral spring 14 is not wound near so tightly, because the spiral spring only has to be wound sufficiently tight enough to accommodate the length of the cord on opposite sides of the reel. Also, the spiral spring 14 should not be wound too tight because this means that it requires too much pull to unwind the opposite ends 23 and 24 of the cord. In ordinary practice, I find that the spring 14, when properly wound is not too strong to pull out the average wall plug, as indicated by the reference character 41, while at the same time having sufficient strength to wind up the cord, as the appliance is moved back and forth.

It is to be pointed out that the material from which my invention is constructed is extremely light, so that it offers substantially no interference with the successful operation of the appliance. In fact, the construction may be so light as to float substantially in the air when the appliance is moved away from the wall plug 41. Therefore, the slack in the cord is always taken up by my reel.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A winding reel adapted to be positioned substantially intermediate the ends of a cord that is to be wound comprising, in combination, a housing, a duplex reel mounted in the housing, said duplex reel having two channels, one of said channels being adapted to receive the cord on one side of the intermediate portion of the cord and the other channel being adapted to receive the cord on the other side of the intermediate portion of the cord, a partition for separating the two channels, said partition having a cross-over opening through which the intermediate portion of the cord passes, said partition also having a removable sector to facilitate the positioning the cord in the said cross-over opening, the combination of the two channels and the said opening being such that the cord on one side of the cross-over opening may be wound from the outside toward the center in a clock-wise direction upon one of the channels and being such that the cord on the other side of the cross-over opening may be wound from the center toward the outside in a counterclockwise direction upon the other channel, so that as the ends of the cord are pulled the reel unwinds, and means for constraining the duplex reel to rotate in the opposite direction to wind the two ends of the cord upon the reel.

2. A winding reel adapted to be positioned substantially intermediate the ends of a cord that is to be wound comprising, in combination, a duplex reel, said duplex reel having two channels, one of said channels being adapted to receive the cord on one side of the intermediate portion of the cord and the other channel being adapted to receive the cord on the other side of the intermediate portion of the cord, a housing for the duplex reel, said housing having two substantially diametrically opposite openings for the cord to pass freely as it is wound or unwound upon the reel, a partition for separating the two channels, said partition having a cross-over opening through which the intermediate portion of the cord passes from one channel to the other, the combination of the two channels and the said opening being such that the cord on one side of the cross-over opening may be wound from the outside toward the center in a clock-wise direction in one of the channels and being such that the cord on the other side of the cross-over opening may be wound from the center toward the outside in a counterclock-wise direction in the other channel so that as the ends of the cord are pulled, the reel unwinds, a central drum mounted transversely of the reel and constituting a hub about which the cord in each of the channels may be wound, and resilient means mounted within the central drum for contraining the duplex reel to rotate in the opposite direction to wind the two ends of the cord upon the reel.

CHARLES F. DOUGLASS.